United States Patent
Mandel et al.

(10) Patent No.: US 11,072,432 B2
(45) Date of Patent: Jul. 27, 2021

(54) METHOD FOR MANUFACTURING A PART MADE OF A COMPOSITE MATERIAL COMPRISING AT LEAST ONE PORTION FORMING A FORCE-INSERTION PORTION OR LOCAL THICKENED PORTION

(71) Applicant: SAFRAN, Paris (FR)

(72) Inventors: Robin Mandel, Paris (FR); Patrick Dunleavy, Palaiseau (FR); Emilie Trousset, Malakoff (FR)

(73) Assignee: SAFRAN, Paris (FR)

( * ) Notice: Subject to any disclaimer, the term of this patent is extended or adjusted under 35 U.S.C. 154(b) by 41 days.

(21) Appl. No.: 15/315,654

(22) PCT Filed: Jul. 2, 2015

(86) PCT No.: PCT/FR2015/051837
§ 371 (c)(1),
(2) Date: Dec. 1, 2016

(87) PCT Pub. No.: WO2016/005686
PCT Pub. Date: Jan. 14, 2016

(65) Prior Publication Data
US 2017/0247115 A1 Aug. 31, 2017

(30) Foreign Application Priority Data
Jul. 7, 2014 (FR) ...................................... 1456524

(51) Int. Cl.
*B29C 65/70* (2006.01)
*B64D 29/06* (2006.01)
(Continued)

(52) U.S. Cl.
CPC .............. *B64D 29/06* (2013.01); *B29C 43/02* (2013.01); *B29C 43/52* (2013.01); *B29C 65/02* (2013.01);
(Continued)

(58) Field of Classification Search
CPC ..... B29C 70/84; B29C 66/72143; B29C 65/70
See application file for complete search history.

(56) References Cited

U.S. PATENT DOCUMENTS 4,100,241 A 7/1978 Hampshire
5,417,385 A 5/1995 Arnold et al.
(Continued)

FOREIGN PATENT DOCUMENTS

EP 2 266 784 A1 12/2010
FR 2 981 002 A1 4/2013
(Continued)

OTHER PUBLICATIONS

International Search Report as issued in International Patent Application No. PCT/FR2015/051837, dated Oct. 6, 2015.
(Continued)

*Primary Examiner* — William P Watkins, III
(74) *Attorney, Agent, or Firm* — Pillsbury Winthrop Shaw Pittman LLP

(57) ABSTRACT

A method for manufacturing of a part made of composite material including pre-compacting to a predetermined shape of a mixture of a first thermosetting resin with discontinuous long fibers so as to form a first preform, pre-curing the first preform until an intermediate conversion stage corresponding to a solidification of said first resin, contacting the first preform with a second preform including a fiber structure of continuous fibers impregnated with a second thermosetting resin, polymerizing the first and second preforms so as to form a part made of composite material including a body made of composite material including reinforcement made of continuous fibers consolidated by an organic matrix provided with a portion made of composite material including reinforcement made of discontinuous long fibers consolidated by an organic matrix.

13 Claims, 4 Drawing Sheets

(51) Int. Cl.
*B29C 65/56* (2006.01)
*B29C 65/00* (2006.01)
*B29C 65/02* (2006.01)
*B29C 70/84* (2006.01)
*B64F 5/10* (2017.01)
*B29C 43/02* (2006.01)
*B29C 43/52* (2006.01)
*B29L 31/30* (2006.01)
*B29C 70/08* (2006.01)
*B29C 70/48* (2006.01)
*B29C 70/44* (2006.01)
*B29K 105/12* (2006.01)

(52) U.S. Cl.
CPC ........ *B29C 65/562* (2013.01); *B29C 66/1122* (2013.01); *B29C 66/474* (2013.01); *B29C 66/524* (2013.01); *B29C 66/532* (2013.01); *B29C 66/61* (2013.01); *B29C 66/72141* (2013.01); *B29C 66/72143* (2013.01); *B29C 66/73753* (2013.01); *B29C 66/73941* (2013.01); *B29C 70/84* (2013.01); *B64F 5/10* (2017.01); *B29C 66/71* (2013.01); *B29C 66/712* (2013.01); *B29C 70/08* (2013.01); *B29C 70/44* (2013.01); *B29C 70/48* (2013.01); *B29K 2105/12* (2013.01); *B29L 2031/30* (2013.01); *B29L 2031/3076* (2013.01)

(56) References Cited

U.S. PATENT DOCUMENTS

| | | |
|---|---|---|
| 6,479,124 B1 | 11/2002 | Porte et al. |
| 2004/0051005 A1 | 3/2004 | Bergmann |
| 2005/0064134 A1 | 3/2005 | Brantley et al. |
| 2006/0208393 A1 | 9/2006 | Karmaker et al. |
| 2008/0075942 A1 | 3/2008 | Gerard et al. |
| 2009/0252921 A1 | 10/2009 | Bottler et al. |
| 2010/0037441 A1* | 2/2010 | Lescostaouec ......... B29B 11/16 28/107 |
| 2010/0112283 A1* | 5/2010 | Howarth ................. B29C 70/42 428/137 |
| 2014/0251529 A1* | 9/2014 | Blot ....................... B29C 70/462 156/196 |

FOREIGN PATENT DOCUMENTS

WO    WO 2006/136755 A2    12/2006
WO    WO 2013/089598 A1    6/2013

OTHER PUBLICATIONS

Office Action as issued in Chinese Patent Application No. 201580012454.3, dated Nov. 9, 2018.

Brooks, C. R., et al., "Failure analysis of engineering materials," China Machine Press, Beijing, May 2003, 5 pages.

* cited by examiner

METHOD FOR MANUFACTURING A PART MADE OF A COMPOSITE MATERIAL COMPRISING AT LEAST ONE PORTION FORMING A FORCE-INSERTION PORTION OR LOCAL THICKENED PORTION

CROSS-REFERENCE TO RELATED APPLICATIONS

This is the U.S. National Stage of PCT/FR2015/051837, filed Jul. 2, 2015, which in turn claims priority to French Patent Application No. 1456524, filed Jul. 7, 2014, the entire contents of all applications are incorporated herein by reference in their entireties.

BACKGROUND OF THE INVENTION

The present invention relates to the manufacture of parts made of composite material comprising a fiber reinforcement densified by a matrix, these parts needing to accomplish local transfers of forces, like in particular the front frames of aircraft engine nacelles, nacelle reverser beams and ram supports, etc.

Some examples of application of the invention relate to parts intended to be subjected locally to mechanical loads, in particular outside of the planes of resistance of a main body of the part, and parts intended to be subjected to matting forces, and more generally to the transmission of force to an attachment.

FIG. 8 illustrates an example of a part 10 made of composite material intended to be subjected locally to mechanical loads, this part 10 including a main body, corresponding here to the skin of an airplane wing 11 and a stiffener 12 in the form of a T attached to the skin 11. Both sub-assemblies of the part 10, to wit the airplane wing skin 11 and the stiffener 12, are each constructed from a structure made of continuous fibers, obtained for example by draping or 2D weaving, the fibers of the structure being pre-impregnated with a thermosetting resin. The connection between the stiffener 12 and the skin 11 is accomplished by co-curing, the pre-impregnated fiber preforms of the stiffener and the skin being pressed against one another during curing in an oven or an autoclave.

However, despite the implementation of a connection between the skin 11 and the stiffener 12, the latter has only low resistance to peeling forces shown by the arrow E in FIG. 8. In fact, the part 10 has, at its connection between the stiffener 12 and the skin 11, a weak area Zf corresponding to the area wherein the stiffener 12 has a high radius of curvature with respect to the surface of the skin 11 to which it is bonded. This area Zf which is rich in resin and lacking in fibers weakens the connection between the stiffener and the skin, particularly with respect to peeling forces exerted on the stiffener.

There is also a need to have available a solution making it possible to create, by assembling sub-assemblies, parts made of composite material which do not include weak areas at the connection interface between the subassemblies of the part.

OBJECT AND SUMMARY OF THE INVENTION

To this end, according to the invention, there is proposed a method for manufacturing a part made of composite material comprising the following steps:

pre-compacting to a predetermined shape of a mixture of a first thermosetting resin with discontinuous long fibers so as to form a first preform, pre-curing the first preform until an intermediate conversion stage of the first thermosetting resin corresponding to a solidification of said first resin, contacting the first preform with a second preform comprising a fiber structure of continuous fibers impregnated with a second thermosetting resin, polymerization of the first and second preforms so as to form a part made of composite material comprising a body made of composite material comprising reinforcement made of continuous fibers consolidated by an organic matrix provided with a portion made of composite material comprising reinforcement made of discontinuous long fibers consolidated by an organic matrix.

Thus, by using a mixture of discontinuous long fibers and a thermosetting resin, it is possible to make one or more subassemblies of a part made of composite material having complex geometries which adapt perfectly to the geometry of the other subassembly(ies) of the part made from continuous fibers. In this manner, parts of composite material are made by assembling subassemblies with homogeneous connection interfaces between the subassemblies. The part obtained has increased mechanical resistance even when a first subassembly thereof is made from discontinuous long fibers and subjected to repeated loads applied in a different direction from the plane(s) of resistance of a second subassembly made from continuous fibers and to which the first subassembly is attached.

According to one particular aspect of the method of the invention, the first and second resins are identical. In this case, the first and second resins are selected from among the epoxy type resins compatible with pre-impregnated applications such as the Hexcel M21, Hexcel 8552, Hexcel M42, Cytec Cycom 977-B, Hexcel M77 products, cyanate-ester type resins and polybismaleimide (BMI) type resins.

According to another particular aspect of the invention, the first and second resins are different. In this case, they can in particular each be selected from among at least the epoxy resins compatible with pre-impregnated applications such as the Hexcel M21, Hexcel 8552, Hexcel M42, Cytec Cycom 977-B, Hexcel M77 products, the cyanate ester type resins and polybismaleimide (BMI) resins.

According to a particular application of the invention for making a part of composite material subjected to matting forces, the method further comprises a step of drilling the body and the portion of the part made of composite material to allow passage of an attachment screw.

The present invention also has as its object a structure part comprising a body made of composite material comprising reinforcement made of continuous fibers densified by a first organic matrix and at least one portion comprising reinforcement made of discontinuous long fibers densified by a second organic matrix, said portion comprising at least one surface in continuous contact with the body of the part.

The connection interface between the portion and the main body being homogeneous and continuous (no area rich in resin and lacking in fibers at the interface and continuous contact between the two subassemblies all along the interface), the portion can be subjected to mechanical loads and matting forces and transfer to the main body the forces arising from these loads without risk of rupture of the connection between the portion and the body, this even when the loads are applied on the part in a direction different from that of the plane(s) of resistance of the body which are defined by the orientation of the continuous fibers in the reinforcement thereof.

According to one particular aspect of the invention, the first and second organic matrices are formed from a same thermosetting resin.

According to another particular aspect of the part of the invention, the first and second organic matrices are formed from different thermosetting resins.

In the case of a part which must carry out local force transfers, the portion can form a force-introduction portion.

Alternatively, in the case of a part made of composite material subjected to matting forces, the portion can form a local thickened portion of the body. This local thickened portion thus allows the cross section of the part to be locally increased so as to improve its resistance to matting forces but without adding mass to the structure as a whole.

In this case, the body and the local thickened portion can each be provided with bores which are aligned one with the other for passage of an attachment screw. Likewise, the part can comprise a body and two local thickened portions each having a surface in continuous contact with a different face of the body of the part.

The part according to the invention can in particular correspond to a structure part of an aircraft selected from among at least one of the following parts: front frame of the nacelle of an aircraft engine, reverser beam of the nacelle and ram support.

BRIEF DESCRIPTION OF THE DRAWINGS

Other features and descriptions of the invention will be revealed from the following description of particular embodiments of the invention, given by way of non-limiting examples, with reference to the appended drawings, wherein.

DETAILED DESCRIPTION OF EMBODIMENTS

The invention applies generally to the fabrication of parts made of composite material comprising a fiber reinforcement densified by an organic matrix, said part comprising a main body on which are present on or more portions, each of these portions being usable to locally introduce forces into the part or to accomplish transmission of forces to an attachment to another part.

Figure 1:
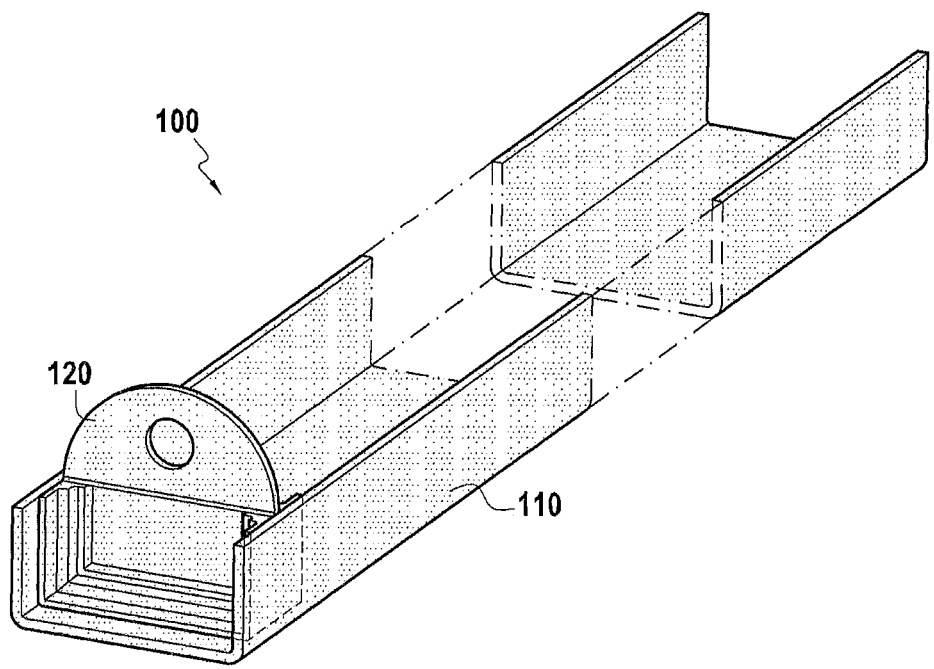
FIG. 1 is a schematic view in perspective of a structure part made of composite material in conformity with one embodiment of the invention.

FIG. 1 illustrates a part 100 corresponding to a generic structure part and comprising a main body 110 having an elongated shape and a portion 120 forming here a force-introduction portion. The portion 120 is in particular intended to be subjected locally to mechanical loads which can be applied in directions different from that of the plane(s) of resistance of the main body defined by the orientation of the continuous fibers in the reinforcement of the latter. The portion 120 can in particular be in connection with a device, for example a ram, or another part introducing forces locally into the part 100 at the portion 120.

These two subassemblies are made of composite material comprising a fiber reinforcement densified by an organic matrix. However, in conformity with the invention and as explained hereafter in detail, the fiber reinforcement of the main body 110 consists of continuous fibers while the fiber reinforcement of the local force-introduction portion 120 consists of discontinuous long fibers.

Figure 2:
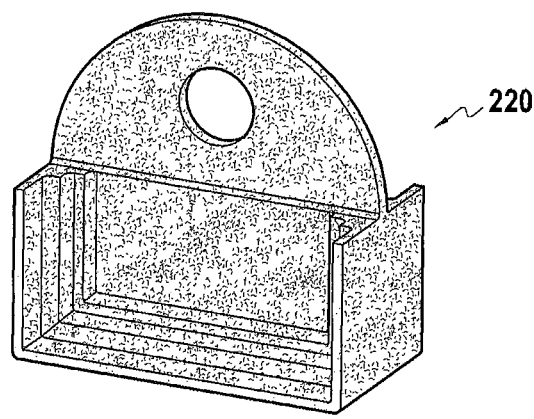
FIG. 2 is a perspective view of a preform of the force introduction portion of the part of FIG. 1.

The manufacture of the part 100 begins with the implementation of a preform 220 of the local force introduction portion 120 (FIG. 2). The preform 120 is obtained by pre-compacting discontinuous long fibers pre-impregnated with a thermosetting resin. The discontinuous long fibers have a length comprised between 8 and 100 mm. The fibers can be made of one of the following materials: glass, carbon, metal, ceramic. The fibers can be formed by extrusion or micro-pultrusion of a filament cut into segments of equal or random length. For carbon or ceramic fibers, a polymer precursor of carbon or ceramics (fiber precursor) can be used, which is deposited on a plate depending on the length of the fibers that it is desired to obtain and thermally treated in known fashion to obtain carbon or ceramic fibers. In the case of metal or glass fibers these can be cut from a block of material. For suitable fiber materials, these can be formed by unidirectional web stamping or compression or by electroforming to shape on a punch.

The discontinuous long fibers can be pre-impregnated individually with thermosetting resin, i.e. during their manufacture, or collectively by impregnating a predetermined quantity of dry fibers with thermosetting resin.

Once pre-impregnated, the discontinuous long fibers are pre-compacted in a mold having a shape corresponding to the final shape of the force-introduction portion 120 (step S1).

The fibers pre-compacted into shape are then subjected to a pre-cure treatment (step S2). By "pre-cure," what is meant here is a heat treatment of the thermosetting resin allowing the thermosetting resin to be brought to an intermediate conversion corresponding to pre-polymerization of the resin, which has a solid phase sufficient to obtain a preform 220 capable of retaining a shape near the final geometry of the force—introduction portion 120. This pre-cure is obtained by heating the resin to a temperature allowing polymerization of the resin to be initiated and over a duration allowing the discontinuous long fibers to be maintained in their compacted state. The degree of advancement making it possible to obtain a sufficiently rigid preform is a function of the geometry of the part and can be estimated at a degree of polymerization between 15% and 50%.

The fabrication of a preform 210 intended to later form the main body 110 of the part 100 is then proceeded with, which begins with the formation of a fiber structure intended to form the fiber reinforcement of the main body 110 (step S3).

In the example described here, the fiber structure is obtained by stacking strata of continuous fibers which can have the form of unidirectional fiber layers, fabric, braid, knit, felt, web or others. The strata can also be linked together, for example by sewing, by implantation of wires or of rigid elements or by needling.

The fiber structure can also be obtained by multilayer weaving between yarns of continuous fibers. This weaving is accomplished continuously by means of a jacquard type loom on which is disposed an array of warp yarns or strands in a plurality of layers, the warp yarns being connected by weft yarns. Multilayer weaving can in particular be weaving with an "interlock" weave, i.e. a weave wherein each layer of weft yarns connects several layers of warp yarns, with all the yarns of one column of weft having the same movement in the plane of the weave. Other known types of multilayer weaving could be used, as in particular those described in document WO 2006/136755, the content whereof is incorporated here by reference.

The continuous fibers constituting the fiber structure are in particular refractory fibers, i.e. fibers made of ceramics, for example of silicon carbide (SIC), carbon fibers or even fibers made of a refractory oxide, for example of alumina ($Al_2O_3$). The fibers can also be glass or metal fibers. In the example described here, the fiber structure is made from fibrous strata made of carbon fibers.

Figure 3:
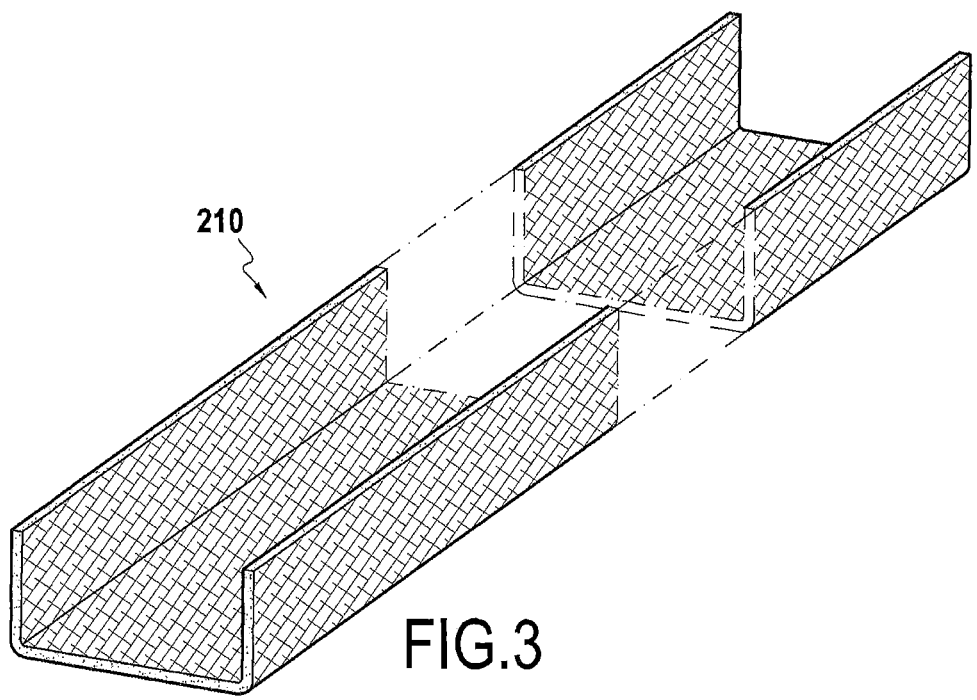
FIG. 3 is a perspective view of a preform of the main body of the part of FIG. 1.

Once terminated, the fiber structure is impregnated with a thermosetting resin, then compacted into shape so as to adjust it to the final shape of the main body and to increase the concentration of fiber therein (step S4, FIG. 3). According to one variant implementation of the method of the invention, the fiber structure intended to form the reinforcement of the main body 110 of the part 100 can be made from continuous fibers already impregnated with a resin intended to form the matrix of the main body.

Figure 4:
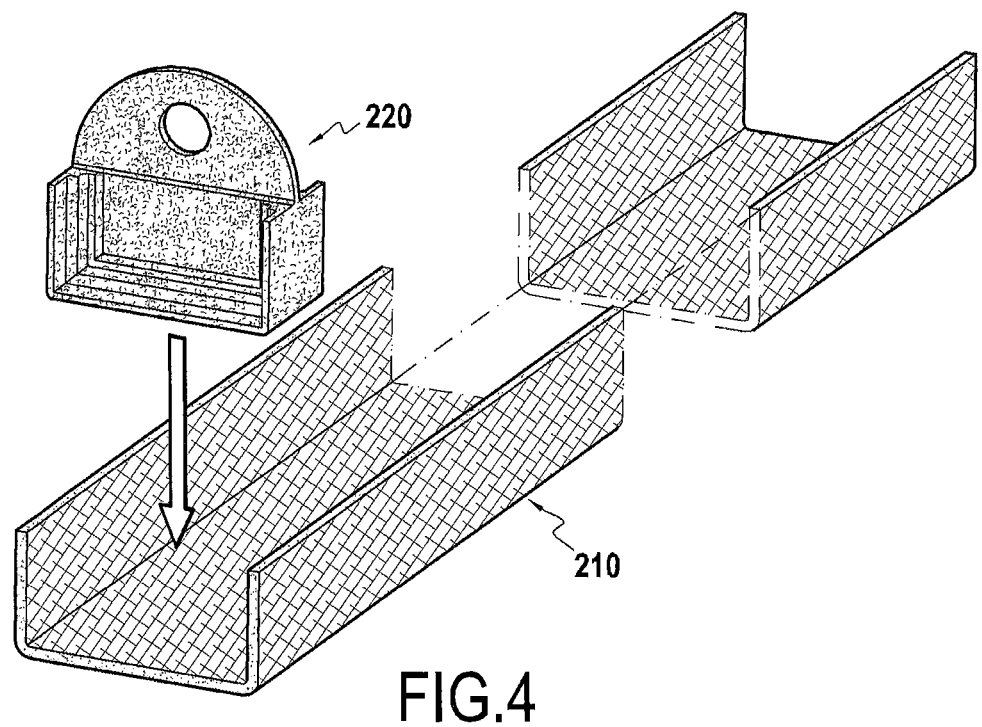
FIG. 4 is an exploded view in perspective showing the contacting of the preform of the force-introduction portion of FIG. 2 with the preform of the main body of FIG. 3.
Figure 5:
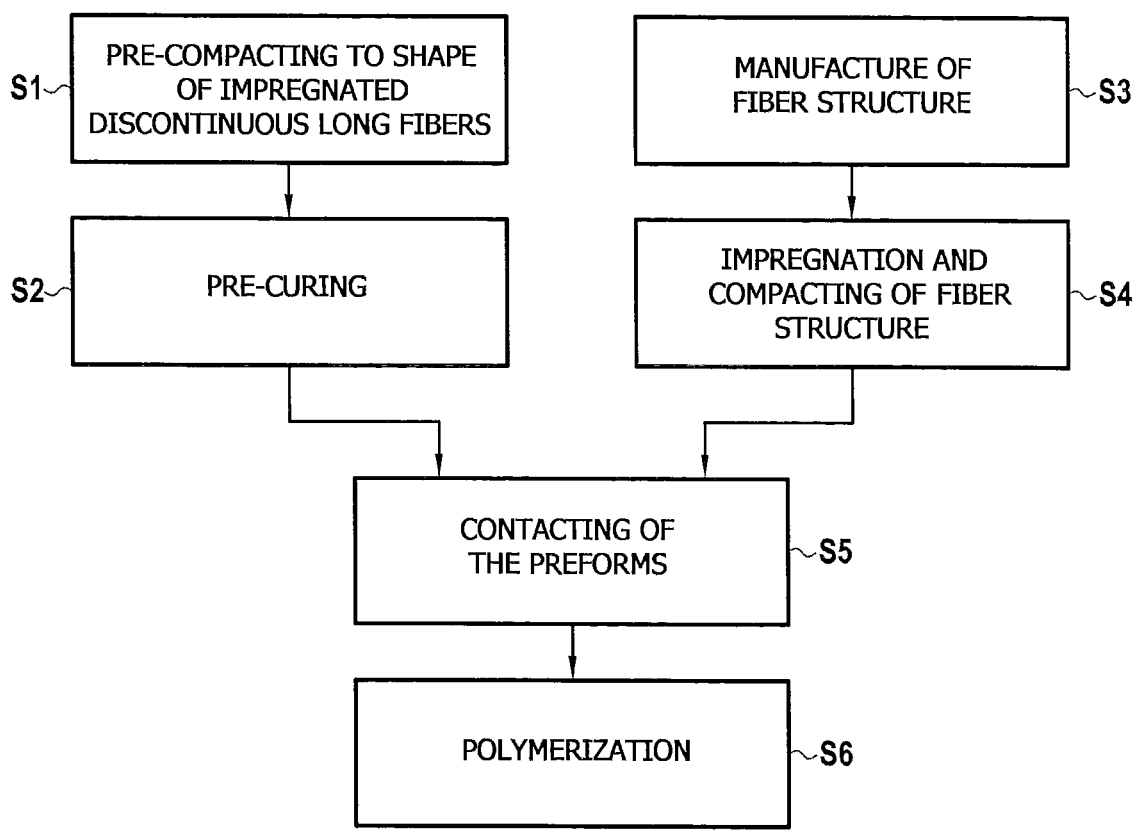
FIG. 5 is a flowchart of the steps implemented in a manufacturing method of the part of FIG. 1 conforming to one embodiment of the invention.

The preform 220 of the force-introduction portion 120 is then contacted with the preform 210 of the main body 110 (step S5, FIG. 4). The polymerization of the assembly is then carried out, i.e., the finalization of the polymerization of the resin of the preform 220 and the complete polymerization of the preform 210 (step S6). The contacting and the polymerization of the preforms can be accomplished in different manners. The preform 220 can for example be pressed against the preform 210 during a compression molding operation of the preform 210, the polymerization being accomplished entirely or partially in the mold or outside it, for example in a post-cure oven.

According to one variant implementation, the preform 220 of the force-introduction portion 120 can be applied prior to impregnation of the fiber structure intended to form the reinforcement of the main body 110. In this case, the preform 210 is a so-called "dry" preform because it does not yet comprise thermoplastic resin, the impregnation of the preform 210 and the polymerization of the preforms 210 and 220 being accomplishable by the well-known method of transfer molding called RTM ("resin transfer molding"). In conformity with the RTM method, the dry fiber preform 210 is placed in a mold having the shape of the main body to be manufactured, with a specific emplacement for maintaining the preform 220 in position. A thermosetting resin is injected into the internal space of the mold which comprises the preform 210. A pressure gradient is generally established in this internal space between the place where the resin is injected and the openings for releasing the latter, so as to control and optimize the impregnation of the preform by the resin. The polymerization of the preforms 210 and 220 can be accomplished entirely or partially in the mold or outside it, for example in a post-cure oven.

By "polymerization of the preforms" is meant here a heat treatment allowing the initiation of a cross-link cycle allowing hardening (co-curing) the first pre-cured resin of the preform 220 and the second resin of the preform 210 and consequently to form the matrix of the composite material of the part 100. During this cross-link cycle, covalent bonds are created at the interface between the first and second resins forming a homogeneous network of cross-link points making this interface mechanically resistant.

The part 100 of FIG. 1 is then obtained, including a main body 110 made of composite material comprising reinforcement of continuous fibers densified by a first organic matrix, and a local force-introduction portion 120 made of composite material comprising reinforcement made of discontinuous long fibers, so-called DLF and a second organic matrix.

The connection interface between the portion 120 and the main body 110 being homogeneous and continuous (no resin-rich area lacking fibers at the interface and continuous contact between the two subassemblies on the entire interface), the portion 120 can be subjected to mechanical loads and transfer to the body 110 the forces arising from these loads without risk of rupturing the connection between the portion 120 and the body 110, this even when the loads are applied on the part 120 in a direction different from that of the resistance plane(s) of the body 110 which are defined by the orientation of the continuous fibers in its reinforcement.

The method of the invention is particularly suited to the manufacture of parts made of composite material comprising a main body of elongated shape (reinforcement made of continuous fibers ensuring good mechanical resistance in the plane(s) of elongation of the body) which must accomplish local force transfers at the force-introduction portion.

Steps S1 and S2, consisting of manufacture of the portion 120 prior to its contacting with the main body and steps S3 and S4, consisting of forming the preform of the main body can of course be carried out in parallel.

According to one aspect of the invention, the thermosetting resins used to form respectively the local force-introduction element and the main body can be identical and selected in particular among the following thermosetting resins: epoxy type resins compatible with pre-impregnated applications such as the Hexcel M21, Hexcel 8552, Hexcel M42, Cytec Cycom 977-B, Hexcel M77 products, cyanate-ester type resins and polybismaleimide (BMI) resins.

In the case of the resin Hexcel 8552 for example, pre-cure is carried out in a press at a temperature of 180° C. for 10 minutes, applying a pressure comprised between 20 and 100 bar in the material so as to have it attain its final state. Co-curing then occurs following the normal cycle of polymerization of a pre-impregnated laminate, to wit about 2 h at 180° C. under a pressure usually comprised between 3 and 10 bar (in an autoclave for example).

According to another aspect of the invention, the thermosetting resins used to form respectively the local force-introduction element and the main body can be different. In this case, the resins used can in particular be selected from among at least one of the resins mentioned earlier.

In the case, for example, of two distinct epoxy resins, pre-cure is carried out in the press at a temperature situated between 120° C. and 180° C. for a duration comprised between 5 and 15 min while applying a pressure between 20 and 100 bar on the material so as to have it attain its final state. This range is a function of the nature of the resin as well as the geometry of the preform.

Co-curing then occurs, following the normal cycle of polymerization of a pre-impregnated laminate, to wit about 2 h at 120° C. or 180° C. under a pressure usually comprised between 3 and 10 bar (in an autoclave for example). Resins having equivalent polymerization temperatures will preferably be used.

Figure 6:
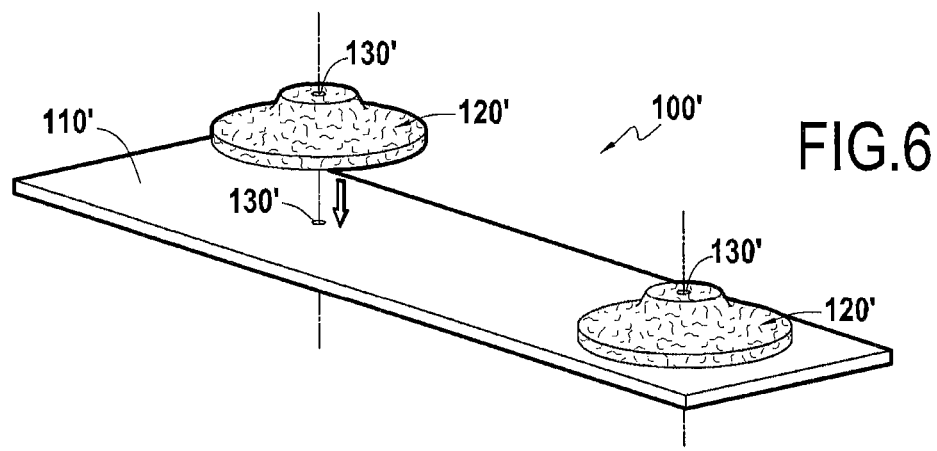
FIG. 6 is a perspective view of a structure part made of composite material conforming to another embodiment of the invention.

FIG. 6 illustrates another embodiment of the invention wherein the part 100' corresponds to a structure part subjected to matting forces. This part comprises a main body 110' with a substantially flat and elongated shape and one or more portions 120' which form here local thickened sections of the body.

The portions 120' and the body are in particular intended to have attachment screws passing through them (not shown in FIG. 6) to attach the part 100' to another part, for example an actuator or a coupling such as those used in a thrust reverser system as described in publication FR 2,986,212. Also, the portions 120' are subjected to matting forces corresponding to the transmission of force to the attachments.

The method of manufacture of such a part 100' is identical in all points with that previously described for the manufacture of the part 100. In particular the part 100' obtained comprises a main body 110' made of composite material comprising reinforcement made of continuous fibers densified by a first organic matrix and one or more local thickened portions 120' made of composite material each comprising reinforcement made of discontinuous long fibers, so-called DLF and a second organic matrix.

At the conclusion of the manufacturing method, bores 130' are made through the portions 120' forming local thickened portions and the main body 110' of the part to allow passage of attachment screws through them (not shown in the figure). These bores 130' are preferably machined once the portions are assembled to the main body to ensure that stress is uniformly distributed. It is however possible to accomplish pre-drilling to a smaller dimension of the portions 120' prior to their assembly so as to facilitate their positioning on the main body.

Figure 7:
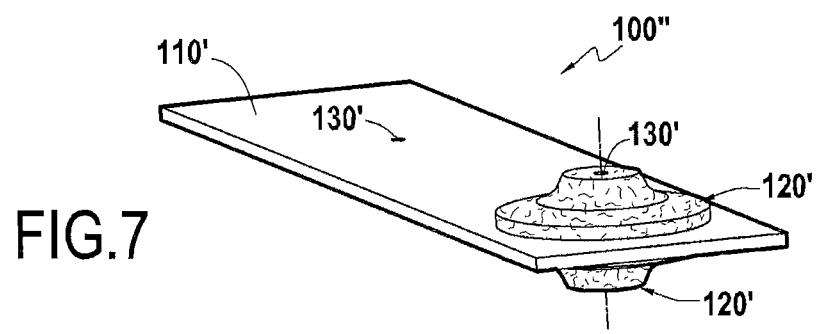
FIG. 7 is a perspective view of the structure part of FIG. 6 according to a variant embodiment.
Figure 8:
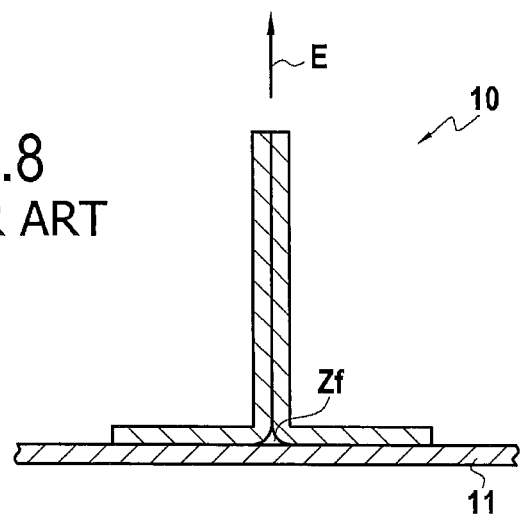
FIG. 8 is a section view of a part made of composite material according to the prior art.

FIG. 7 illustrates a variant embodiment wherein the part 100" has two portions 120' which are positioned on the two opposite faces of the main body 110' of the part at the same location thereof so as to form a double thickened portion of the main body. These portions and the main body are drilled here to allow passage of an attachment screw (not shown).

The invention claimed is:

1. A method for manufacturing a part made of composite material comprising:
   precompacting to a predetermined shape of a mixture of a first thermosetting resin with discontinuous long fibers of length between 8 mm and 100 mm so as to form a first preform, the first preform consisting of the first thermosetting resin and the discontinuous long fibers,
   pre-curing the first preform until an intermediate conversion stage of the first thermosetting resin corresponding to a solidification of said first resin,
   contacting the first preform with a second preform comprising a fiber structure of continuous fibers impregnated with a second thermosetting resin, and
   polymerizing the first and second preforms so as to form a part made of composite material comprising a body made of composite material comprising reinforcement made of continuous fibers consolidated by an organic matrix provided with a portion made of composite material comprising reinforcement made of discontinuous long fibers consolidated by an organic matrix.

2. The method according to claim 1, wherein the first and second resins are identical.

3. The method according to claim 2, wherein the first and second resins are selected from among at least the following resins: epoxy type resins, cyanate-ester type resins and polybismaleimide type resins.

4. The method according to claim 2, wherein the first and second resins are different.

5. The method according to claim 1, further comprising drilling the body and the portion of the part made of composite material to allow passage of an attachment screw.

6. A structure part comprising a body made of composite material comprising reinforcement made of continuous fibers densified by a first organic matrix and at least one portion comprising reinforcement made of discontinuous long fibers of length between 8 mm and 100 mm densified by a second organic matrix, said portion comprising at least one surface in continuous contact with the body of the part wherein the structure part is made from a first preform, the first preform consisting of a first thermosetting resin and the discontinuous long fibers.

7. The part according to claim 6, wherein the first and second organic matrices are formed from a same thermosetting resin.

8. The part according to claim 6, wherein the first and second organic matrices are formed from different thermosetting resins.

9. The part according to claim 6, wherein the portion forms a force-introduction portion.

10. The part according to claim 6, wherein the portion forms a local thickened portion of the body.

11. The part according to claim 10, wherein the body and the local thickened portion are each provided with bores which are aligned one with the other for passage of an attachment screw.

12. The part according to claim 10, comprising two local thickened portions each having a surface in continuous contact with a different face of the body of the part.

13. The part according to claim 6, wherein the part corresponds to a structure part of an aircraft selected from among at least one of the following parts: front frame of the nacelle of an aircraft engine, reverser beam of the nacelle and ram support.

* * * * *